United States Patent [19]

De Luca et al.

[11] Patent Number: 4,811,169
[45] Date of Patent: * Mar. 7, 1989

[54] SINGLE SIDED DSX FRAME

[75] Inventors: Paul V. De Luca, Plandome Manor; Michael Shatzkin, Baldwin; Albert Atun, Valley Stream, all of N.Y.

[73] Assignee: Porta Systems Corp., Syosset, N.Y.

[*] Notice: The portion of the term of this patent subsequent to Mar. 10, 2004 has been disclaimed.

[21] Appl. No.: 939,021

[22] Filed: Dec. 8, 1986

[51] Int. Cl.⁴ .......................... H02B 1/04; H02B 1/20
[52] U.S. Cl. ..................... 361/429; 361/428; 174/97; 379/327; 439/922; 439/719
[58] Field of Search .................... 339/198 R, 198 G; 379/327, 328; 174/97; 361/331, 332, 393, 394, 417, 419, 420, 426, 428, 429; 439/922, 709, 719

[56] References Cited

U.S. PATENT DOCUMENTS

| | | | |
|---|---|---|---|
| 3,943,412 | 3/1976 | Wickstrom | 361/428 |
| 4,002,856 | 1/1977 | Sedlacek | 361/428 |
| 4,117,273 | 9/1978 | Gautier | 379/329 |
| 4,536,052 | 8/1985 | Baker | 379/329 |
| 4,649,236 | 3/1987 | De Luca | 379/327 |
| 4,665,546 | 5/1987 | Brey | 361/428 |

OTHER PUBLICATIONS

ADC, Mini-DSX Digital Signal Cross Connect., Advertising Brochure #215, 9/85.

Primary Examiner—G. P. Tolin
Attorney, Agent, or Firm—Charles E. Temko

[57] ABSTRACT

A single sided telephone frame particularly suited for DSX use utilizing a standard relay rack. In-plant equipment cables are interconnected to equipment blocks at an upper end of the frame. Below the equipment blocks are a group of jack panels located between groups of cross-connect block elements to maintain cable connections therebetween as short as possible. Connections between groups of cross-connect blocks to the jack panel elements, and from the jack panel elements to the equipment block elements are principally through a single vertical trough along one side of the frame, thereby permitting maximum space utilization. Each of the elements includes a metallic enclosure having members forming segments of the trough which are aligned to vertical congruency upon assembly upon the frame.

3 Claims, 5 Drawing Sheets

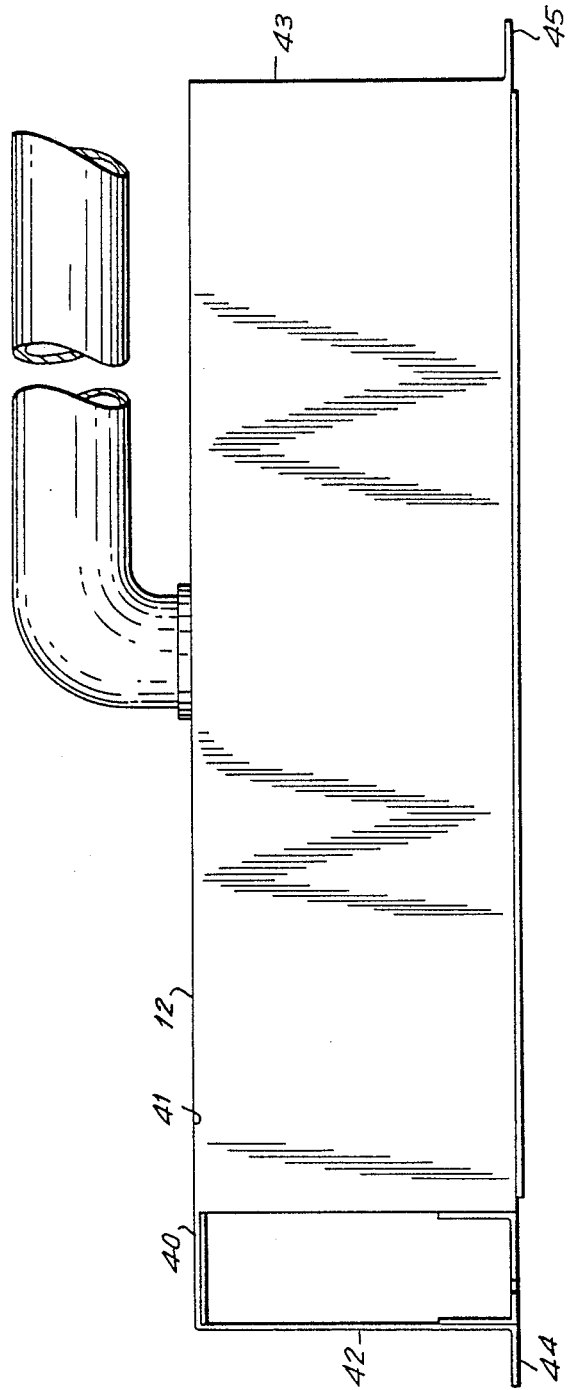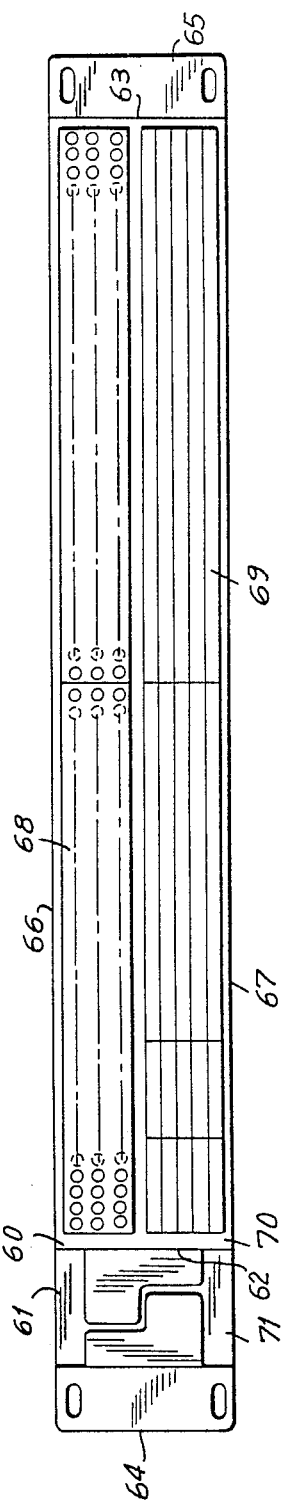
FIG. 3
FIG. 4

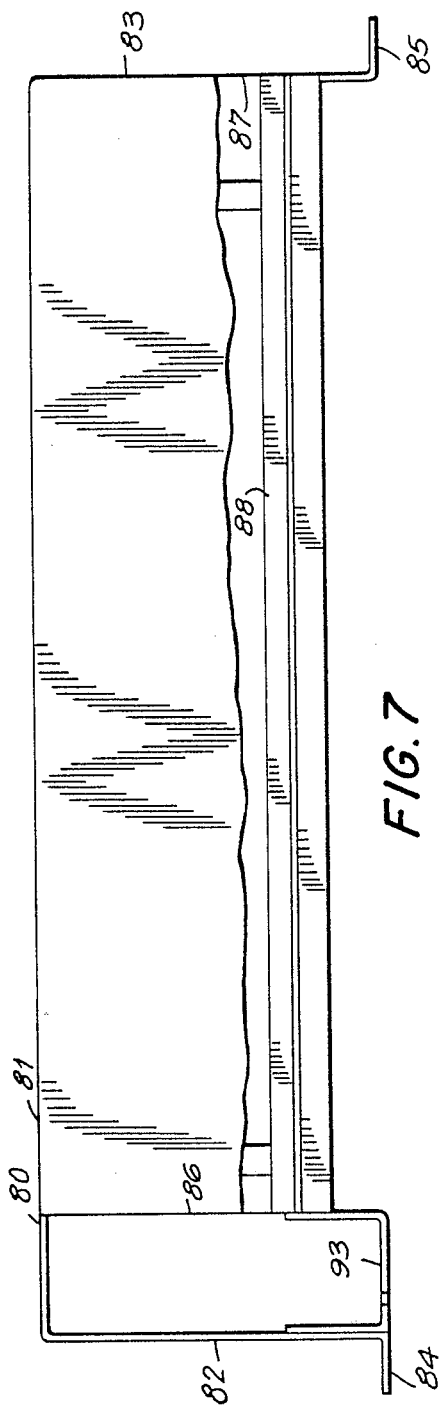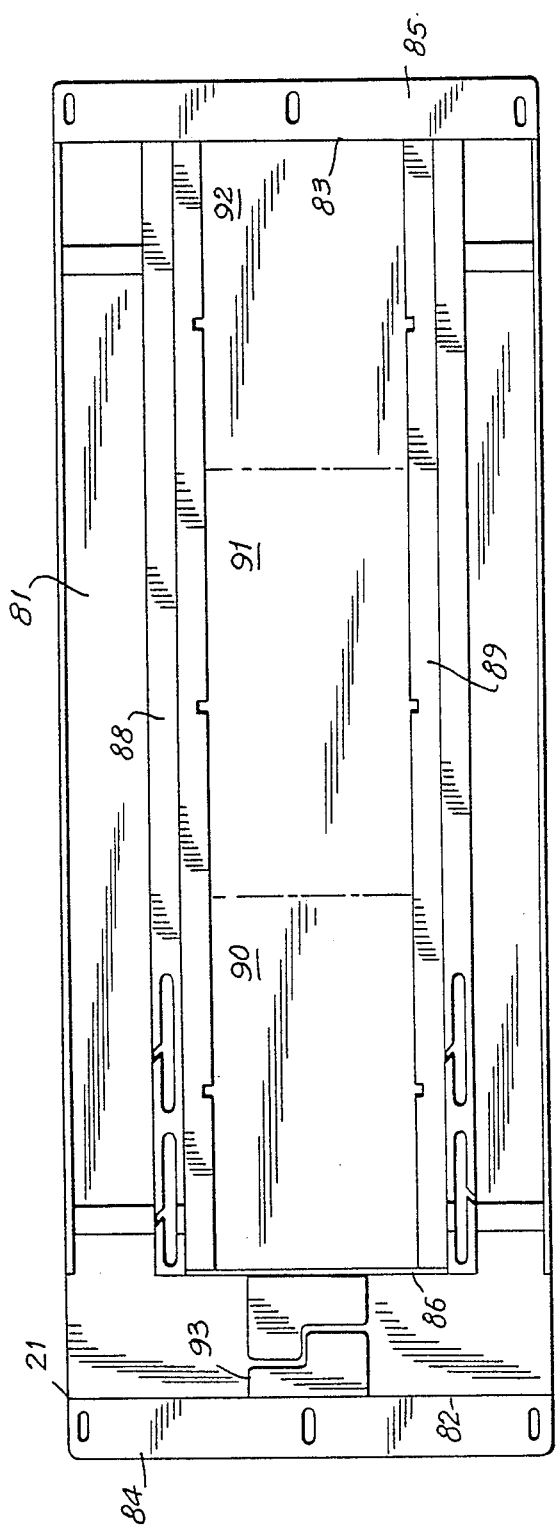

SINGLE SIDED DSX FRAME

BACKGROUND OF THE INVENTION

This invention relates generally to the field of telephony, and more particularly to an improved single sided frame normally installed in a telephone office for administering DSX lines.

With the advent of solid state technology, there has been a rapid expansion in the use of DSX installations which permit, through the conversion of analog signals to digital, the use of a single pair to carry a very large number of messages simultaneously. The usual practice is to carry an analog signal from the subscriber to the nearest telephone office, at which point it is converted to digital and transmitted to the ultimate telephone office for conversion back to analog and transmission to the individual receiving subscriber. In the case of very large buildings, it is often feasible to install means for conversion to digital signals or conversion to analog on the premises prior to transmission to the nearest telephone office. It is in such relatively remote locations that the present disclosure has application.

In order to interface between pieces of digital equipment, it is common to provide a DSX frame which incorporates jack panels, cross-connect blocks and equipment interconnecting blocks on a single frame to provide a centralized location for rearranging, cross connecting, maintaining testing and restoring service to DS1 and DS1C circuits.

The usual problem is one of effective space utilization, and all telephone offices and other places of installation have finite space limitations although they must provide service for an ever growing number of subscribers. Design efforts in this area have largely concentrated in the area of providing maximum density of circuitry without limiting access to such circuitry.

SUMMARY OF THE INVENTION

Briefly stated, the invention contemplates the provision of an improved single sided DSX frame of the class described, in which provision has been made for realizing the above criterion. To this end, there is provided a standard relay rack having means for mounting plural generally horizontally arranged components, each having means at one end thereof providing a segment of a vertical trough when assembled upon the frame. Cables leading from digital equipment are connected to equipment blocks located at an uppermost location on the frame. Below the equipment blocks are groups of parallel jack panels which are interspersed between individual cross-connect elements, each mounting a plurality of cross-connect blocks. The enclosures mounting the equipment blocks, jack panels and cross-connect blocks are each provided with means forming a vertically oriented trough segment, with the jack panel and cross connect element segments being placed in congruent relation upon assembly of these components upon the frame to result in a single wire trough extending between the upper and lower ends the frame. As a result, cable lengths from equipment blocks to jack panels, and from jack panels to cross-connect blocks are of minimum length, and may be readily identified both at the time of installation and subsequently.

BRIEF DESCRIPTION OF THE DRAWING

In the drawing, to which reference will be made in the specification, similar reference characters have been employed to designate corresponding parts throughout the several views.

FIG. 3 is a top plan view of a jack panel assembly forming a part of the disclosed embodiment.

FIG. 4 is a front elevational view thereof.

FIG. 7 is a top plan view, partly broken away to show detail, of a cross-connect frame assembly.

FIG. 8 is a front elevational view thereof.

DETAILED DESCRIPTION OF THE DISCLOSED EMBODIMENT

Figure 1:
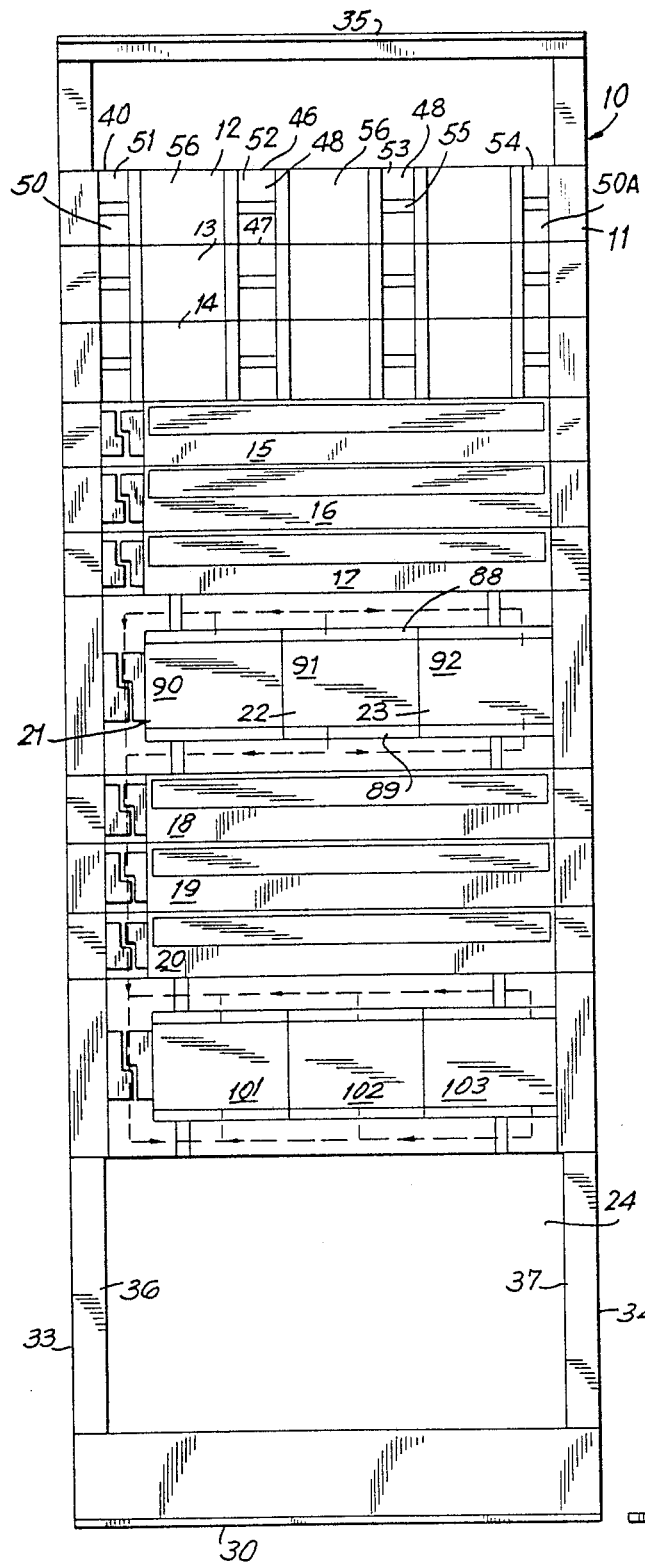
FIG. 1 is a schematic front elevational view of an embodiment of the invention.

In accordance with the invention, the device, generally indicated by reference character 10, comprises broadly: a main frame element 11, a plurality of equipment block elements 12, 13, and 14; a plurality of upper jack panel elements 15, 16 and 17, a plurality of lower jack panel elements 18, 19 and 20; cross connect block elements 21, 22 and 23, and a protection panel element 24.

Figure 2:
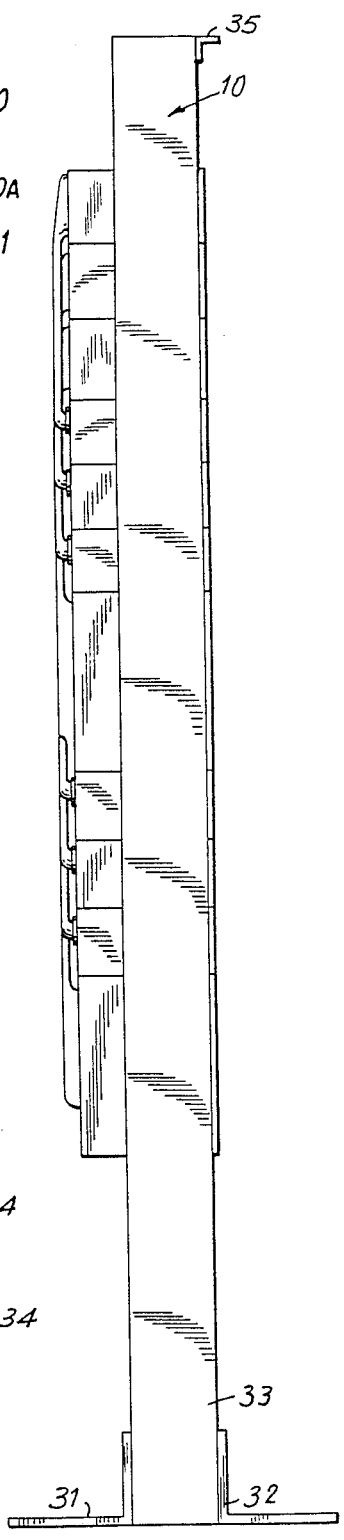
FIG. 2 is a schematic side elevational view thereof.
Figure 5:
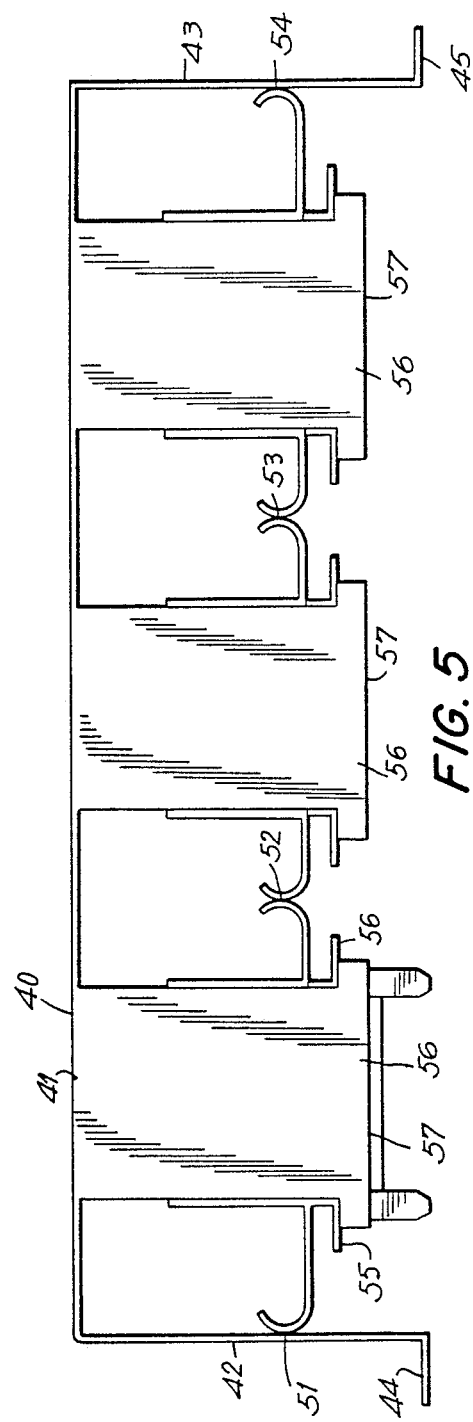
FIG. 5 is a top plan view of an equipment block assembly.
Figure 6:
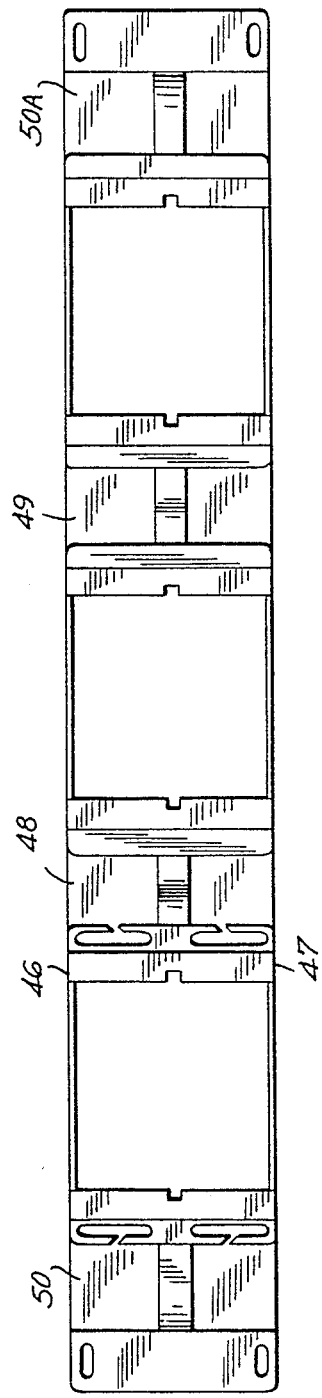
FIG. 6 is a front elevational view thereof.

The main frame element 11 may be a standard relay rack of known type, normally twenty-three inches wide and approximately seven feet high. In the configuration disclosed, it is capable of accommodating five hundred forty pairs (not shown). It includes a lower wall 30, side braces 31 and 32 (FIG. 2), vertical sides 33 and 34, and an upper wall 35. The sides 33 and 34 are each provided with forwardly facing mounting flanges 36 and 37 which are disposed in coplanar relation.

The equipment block elements 12-14, inclusive, are identical, each including a metallic enclosure 40 having a rear wall 41, a pair of side walls 42-43 and frame mounting flanges 44-45 adapted to overlie the flanges 36-37. The enclosure 40 is bounded by continuous upper and lower edges 46 and 47. Within the enclosure 40 are a pair of central trough forming members 48 and 49 and a pair of side trough forming members 50 and 50A. Openings are provided at 51, 52, 53 and 54 for the insertion of cable (not shown). Angularly disposed mounting flanges 55 provide for the engagement of equipment blocks 56 (illustrated schematically), which may be either of the wire wrap pin type or quick clip type, either type of terminal extending from a forward surface 57.

The upper jack panel elements 15-17 and lower jack panel elements 18-20 are also identical, each including a metallic enclosure 60 having a rear wall 61, side walls 62 and 63, mounting flanges 64 and 65 and being bounded by upper and lower continuous parallel edges 66 and 67. A jackfield 68, of known type, and parallel designation panel 69 are supported on a cover 70 overlying the enclosure 60. Trough-forming members 71 are adapted to underlie the trough-forming member 93 to form a continuation, whereby cable (not shown) may interconnect cross connect blocks, equipment blocks and jackfields at the rear thereof.

The cross-connect block elements 21, 22 and 23 are also identical, each including a metallic enclosure 80 having a rear wall 81, side walls 82 and 83 and mounting flanges 84 and 85. Intermediate side walls 86 and 87 support transverse rails 88 and 89 providing means for the mounting of cross-connect blocks 90, 91 and 92. Trough-forming members 93 provide a congruent trough segment communicating with member 71 as will be apparent from a consideration of FIG. 1.

Figure 9:
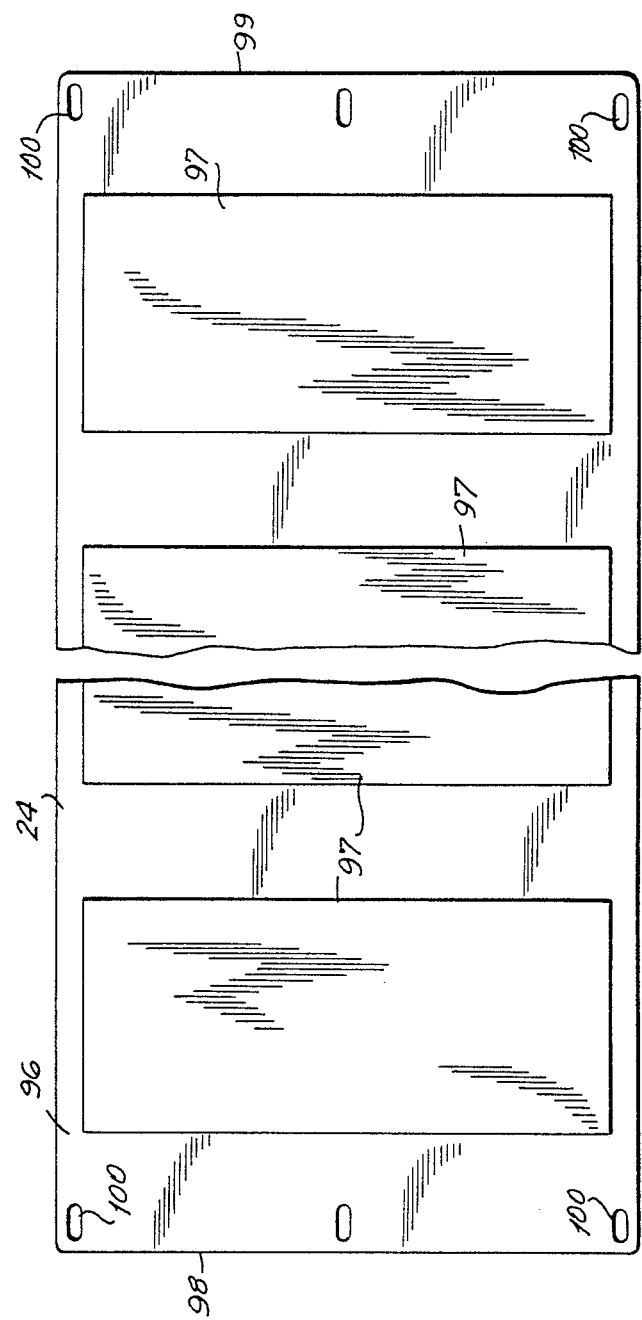
FIG. 9 is a front elevational view of a protector panel.

The protector panel element 24 (FIG. 9) provides a means for optional circuit protection on the main frame element 11. It includes a sheet metal wall 96 carrying a plurality of protector blocks 97, normally one hundred pair capacity. The vertical edges 98 and 99 are provided with openings 100 to permit mounting on the flanges 36 and 37, normally at a lowermost part of the element 11.

The additional jack panel elements 18, 19 and 20 may be installed at the time the device is installed at location, or may be added as the number of circuits to be handled grows. This is also true of the cross-connect block elements 101–103 communicating therewith. The elements 101–103 are identical to their counterparts above-described, and include corresponding trough-forming members which extend the length of the main trough through substantially the entire height of the device.

It will be apparent that the above-described structure provides the considerable flexibility to adapt the same for a particular installation. Each of the component electrical elements is of standardized dimension and is generally horizontally oriented so that desired combinations may be conveniently assembled on the main frame. Each includes trough-forming means at a common end thereof so that upon assembly, a continuous main trough is formed which extends in a vertical direction and permits convenient interconnection of any of the elements with any of the others. Since the wiring in the trough is visible from the front side of the frame, the device may be mounted adjacent to or upon a wall, there being no need to have access to the rear of the frame after installation. Where the device is installed to accommodate less than its full capacity, some of the elements may be omitted, to be added as required, thereby keeping costs of installation at a minimum until additional costs can be justified.

We wish it to be understood that we do not consider the invention to be limited to the precise details of structure shown and set forth in this specification, for obvious modifications will occur to those skilled in the art to which the invention pertains.

We claim:

1. An improved single sided frame for telephonic use comprising: a main frame element having a pair of opposed vertical walls, said vertical walls each having a transversely oriented mounting flange thereon; a plurality of equipment block elements in vertically juxtaposed relation mounted upon said mounting flanges, each of said equipment block elements including a metallic enclosure having a rear wall, a pair of opposed side walls, and a plurality of equipment blocks mounted within said enclosure, said enclosure including trough-forming members defining a segment of a vertical trough between upper and lower parallel edges of said enclosure; a plurality of jack panel elements in vertically juxtaposed relation mounted upon said mounting flanges, each jack panel element including a metallic enclosure having a rear wall, a pair of opposed side walls, a front wall, and a jackfield element supported upon said front wall, said last mentioned enclosure including trough forming members at one end thereof defining a trough communicating with the trough formed by said juxtaposed equipment block elements; and a pair of cross-connect block elements, each positioned in juxtaposed relation to a jack panel element and including a metallic enclosure having a rear wall, a pair of opposed side walls, and a plurality of cross-connect blocks supported by said enclosure, said last mentioned enclosures including trough forming members defining a trough at one end thereof in aligned relation relative to the troughs formed by said equipment block elements and said jack panel elements to provide a continuous trough extending substantially the height of said main frame element.

2. A single sided frame in accordance with claim 1, further characterized in said equipment block elements being positioned at an upper end of said frame, said jack panel elements being mounted in groups below said equipment block elements, and said cross-connect block elements are mounted between groups of jack panel elements.

3. A single sided frame in accordance with claim 2, further characterized in the provision of a protector panel element positioned at a lower end of said frame element beneath said cross-connect block elements.

* * * * *